US 6,187,183 B1

(12) United States Patent
Weaver et al.

(10) Patent No.: US 6,187,183 B1
(45) Date of Patent: Feb. 13, 2001

(54) WASTE WATER TREATMENT PROCESS AND SYSTEM WITH FILTERING MEDIA

(75) Inventors: Lloyd Weaver, West Bath; James C. Monroe; James R. Gray, both of Gray, all of ME (US)

(73) Assignee: Septitech, Inc., Gray, ME (US)

( * ) Notice: Under 35 U.S.C. 154(b), the term of this patent shall be extended for 0 days.

(21) Appl. No.: 09/546,433

(22) Filed: Apr. 10, 2000

Related U.S. Application Data

(63) Continuation of application No. 08/850,615, filed on May 2, 1997, now abandoned.

(51) Int. Cl.[7] .................................................. B01D 33/70
(52) U.S. Cl. ........................................... 210/150; 210/617
(58) Field of Search ................................. 210/150, 617, 210/616, 615

(56) References Cited

U.S. PATENT DOCUMENTS

| | | | |
|---|---|---|---|
| 2,071,591 | 2/1937 | Tholin | 210/8 |
| 3,403,095 | 9/1968 | Chipperfield et al. | 210/17 |
| 3,546,111 | 12/1970 | Busch | 210/10 |
| 3,617,566 | 11/1971 | Oshima et al. | 210/40 |
| 3,779,906 | 12/1973 | Levin | 210/7 |
| 4,005,010 | 1/1977 | Lunt | 210/17 |
| 4,009,099 | 2/1977 | Jeris | 210/151 |
| 4,165,281 | 8/1979 | Kuriyama et al. | 210/17 |
| 4,279,753 | 7/1981 | Nielson et al. | 210/605 |
| 4,521,311 | 6/1985 | Fuchs et al. | 210/616 |
| 4,576,718 | 3/1986 | Reischl et al. | 210/617 |
| 4,678,582 | 7/1987 | Lavigne | 210/150 |
| 4,908,128 | 3/1990 | Chiba | 210/150 |
| 5,030,353 | 7/1991 | Stuth | 210/615 |
| 5,037,240 | 8/1991 | Sherman | 405/128 |
| 5,089,137 | 2/1992 | McKown | 210/615 |
| 5,200,081 | 4/1993 | Stuth | 210/615 |
| 5,202,027 | 4/1993 | Stuth | 210/615 |
| 5,221,470 | 6/1993 | McKinney | 210/151 |
| 5,314,621 | 5/1994 | Rogalla | 210/618 |
| 5,318,699 | 6/1994 | Robertson et al. | 210/151 |
| 5,352,357 | 10/1994 | Perry | 210/150 |
| 5,360,556 | 11/1994 | Ball et al. | 210/804 |
| 5,384,049 | 1/1995 | Murphy | 210/629 |
| 5,387,344 | 2/1995 | McCombs et al. | 210/617 |
| 5,393,427 | 2/1995 | Barnard | 210/605 |
| 5,395,529 | 3/1995 | Butler | 210/619 |
| 5,399,266 | 3/1995 | Hasegawa et al. | 210/615 |
| 5,407,564 | 4/1995 | Thrailkill | 210/167 |
| 5,434,332 | 7/1995 | Cash | 588/1 |
| 5,441,642 | 8/1995 | Wickens | 210/614 |
| 5,451,320 | 9/1995 | Wang et al. | 210/604 |
| 5,492,624 | 2/1996 | Rozich | 210/605 |
| 5,500,112 | 3/1996 | McDonald | 210/151 |
| 5,538,635 | 7/1996 | Mazewski et al. | 210/617 |
| 5,549,828 | 8/1996 | Ehrlich | 210/602 |
| 5,690,827 | 11/1997 | Simmering et al. | 210/617 |
| 5,707,513 | 1/1998 | Jowett et al. | 210/150 |
| 5,766,454 | 6/1998 | Cox et al. | 210/151 |

*Primary Examiner*—Chester T. Barry
(74) *Attorney, Agent, or Firm*—Hamilton, Brook, Smith & Reynolds, P.C.

(57) ABSTRACT

A waste water treatment method and system including a recirculating treatment zone and a filter/treatment zone. The recirculating zone has a treatment medium that includes aerobic microbes and small beads that create interstices within, and extensive surface area on, which active microbes dwell and through which dead microbes and treated water are permitted to easily pass. The filter/treatment zone has a filter/treatment medium that includes peat and small beads that create interstices through which filtered water is permitted to pass. The recirculating treatment zone is designed to be coupled to a settling unit, such as a septic tank. The filter/treatment zone may be coupled to a leach field, with ultraviolet disinfection for coupling to a secondary water user, a soak hose system, etc. The present invention is sufficiently effective so as to reduce to desirable levels the TSS, BOD, *E-Coli*, nitrogen-containing compounds, phosphorus-containing compounds, and bacteria of waste water in a manner that is cost-effective and that permits water recycling for many applications.

5 Claims, 1 Drawing Sheet

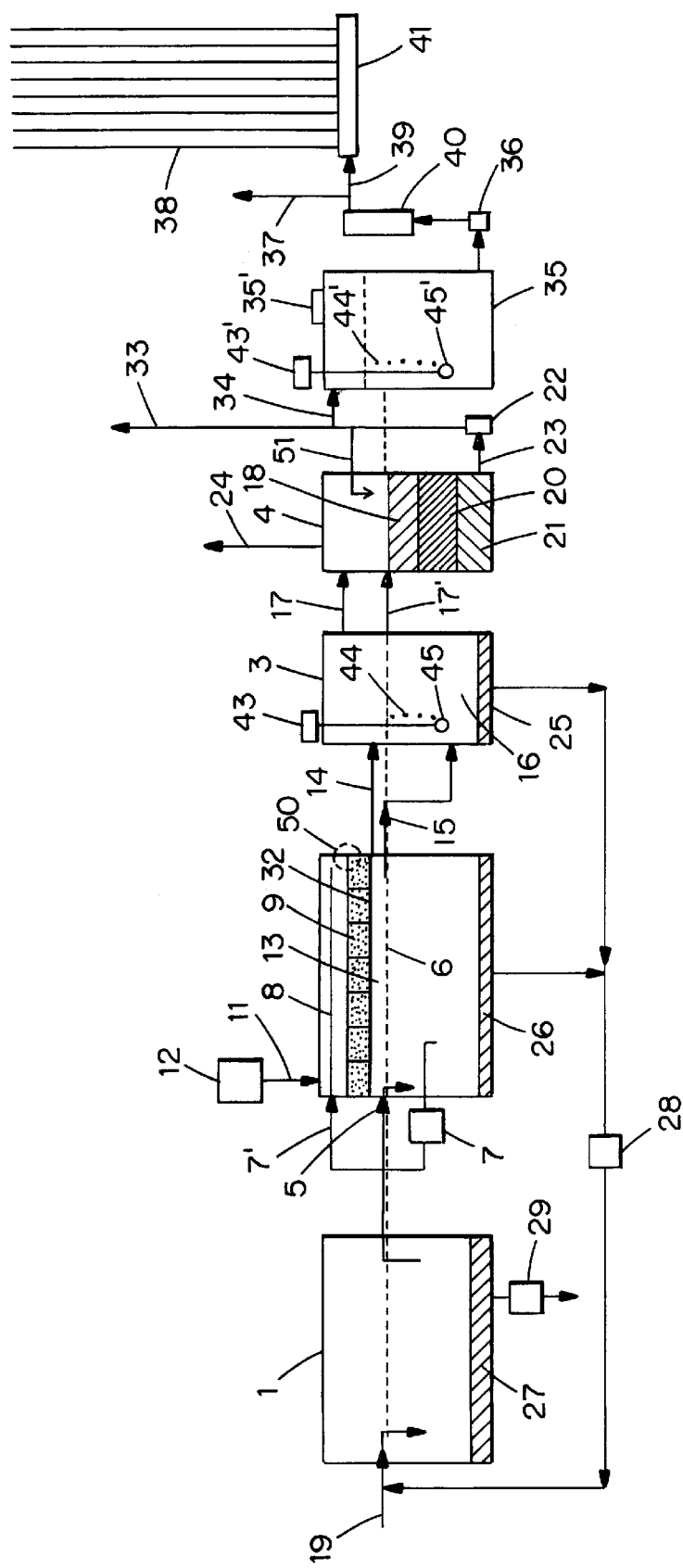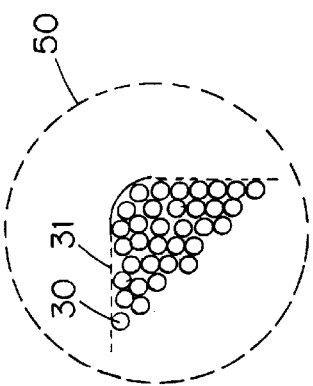
FIG. 1
FIG. 2

US 6,187,183 B1

WASTE WATER TREATMENT PROCESS AND SYSTEM WITH FILTERING MEDIA

RELATED APPLICATION

This application is a continuation of U.S. Ser. No. 08/850,615, filed May 2, 1997, now abandoned, the entire teachings of which are incorporated herein by reference.

BACKGROUND OF THE INVENTION

1. Field of the Invention

The present invention relates to systems for treating waste water. More particularly, the present invention relates to waste water treatment systems including biological media used to aerobically treat solid waste in the waste water. Still more particularly, the present invention relates to such treatment systems for large-, and small-scale waste water systems. The present invention includes novel methods for effectively treating waste water in a way that minimizes the size of the system required to output high-quality, environmentally-suitable, water.

2. Description of the Prior Art

Waste water treatment systems are ubiquitous, from the smallest single-family residence septic system, to industrial facilities for commercial operations and municipalities large and small. It is always the object of such systems to treat for total suspended solids (TSS), biochemical oxygen demand (BOD), nitrogen compounds, *E-coli*, phosphorous, and virtually any other bacteria, so as to minimize the quantity of such undesirables output by the system. Various well known means have been devised for achieving such goals, with varying degrees of success and efficiency. An overriding general problem, for the most part, with such prior systems has been the scale of operation required to effectively treat that water with high-quality output. That is, for the volumes of water to be treated, the sizes of these systems are correspondingly large. This may be particularly true for relatively small-scale systems, such as single-family residences and small groupings of homes and/or buildings, where coupling to a municipal treatment system may be unsuitable.

In the array of systems designed to treat waste water, many include the use of biological treatments to accelerate the breakdown of solids and the various contaminants associated with waste water. This biological treatment involves the use of microbes having an affinity for the pollutants contained in the water. That is, rather than simply permit solids to slowly decant from the waste water, and then apply a hazardous chemical treatment designed to destroy the pollutants—along with virtually everything else in the water—these microbes are permitted to act upon the waste water. In relative terms, they act to remove the pollutants faster than if nothing were used, and do so without the hazardous and difficulties associated with chemical treatment. They must, however, be permitted to reside in some type of holding tank in order to multiple and feed on the contaminants. Upon completion of their ingestion of the pollutants, the microbes simply die and end up as waste solids that fall to the bottom of the treatment tank or unit for subsequent removal. The treated water then passes to the next stage, which may simply be some form of a leach bed, or it may be a more complex system, including, but not limited to, an ultraviolet disinfection means for subsequent transport to a body of water, or for recycling in non-critical uses, such as horticulture.

Unfortunately, while aerobic and anaerobic microbe treatment has significant advantages, it is not exceedingly effective in that it is necessary to provide sufficient "dwell time" for the microbes to "eat" enough of the pollutants so that the waste water is rendered satisfactorily contaminant-free. Of course, the extent to which contaminant removal is satisfactory is a function of governmental regulation. In any case, the volume of water that must be treated can often lead to the need for a rather large-scale treatment unit for a relatively small waste-water-generating facility. As a result, there is often a compromise in the prior systems, which compromise is associated with the contamination-removal requirements, the space available to treat the waste water output, and the cost associated with both.

Another problem with such prior systems has been their efficiency over a period of time of use. When the waste water to be treated requires the use of a considerable amount of biological mass, there results a problem of "plugging" of the mass. That is, as waste solids build up on the surface of the mass, or as microbes ingest the pollutants and die they do not always fall to the bottom of the tank. Instead, they become trapped at or near the surface of the mass. This plugging or blocking of the mass significantly reduces the pathways by which subsequent pollutants may pass through to underlying active microbes that are located below the surface of the mass. There are two negative results: 1) the acceleration of pollutant decay caused by microbe ingestion is canceled; and 2) water flow through the mass is reduced and possibly even stopped. It is therefore necessary to either build a substantially larger unit than would otherwise be required—in order to account for this plugging—or to expend the effort to clean the clogged system. Such maintenance may include the introduction of agitation means or the use of pressurized water for removal of dead microbes, and the reintroduction of active ones on a regular basis.

Several prior waste-water treatment systems have been described. These systems have apparently been designed for large- and/or small-scale treatment using biological media to accelerate contaminant reduction. For the most part, they include biological treatment as well as mechanisms designed to enhance the effectiveness of the microbial action. However, each in turn suffers from one or more deficiencies that significantly affect the ability to provide the most effective and relatively inexpensive waste treatment system.

U.S. Pat. No. 4,005,010 issued to Lunt describes the use of mesh sacks containing the biological medium. The sacks are apparently designed to hold the microbes while allowing fluids to pass through. This unit nevertheless may still result in plugging in that the biological medium will likely become clogged during the course of its usage. U.S. Pat. No. 4,165,281 issued to Kuriyama et al. describes a waste water treatment system that includes a mat designed to contain the microorganisms. A plurality of mats are disposed vertically and waste water is supposed to pass therethrough. The likelihood of plugging is greater in this unit than in the Lunt device because of the orientation of the mats and the difficulty in maintaining and/or replacing them.

U.S. Pat. No. 4,279,753 issued to Nielson et al. describes the arrangement of a plurality of treatment reactors, alternating from aerobic to anaerobic action. There may be some advantage in using a plurality of small tanks rather than one large tank to achieve the decontamination required in that dwell time is increased; however, this is certainly more costly than is necessary. Moreover, while Nielson indicates that it is necessary to address plugging problems, the technique for doing so is relatively crude and likely not completely effective. U.S. Pat. No. 4,521,311 issued to Fuchs et al. teaches the use of a filtering bed through which the waste water passes and which includes support bedding to suspend the biological medium. The device has a rather complex recirculation process required in order to ensure cleaning of the bedding and the microbes. This device may experience clogging of another sort, and the bedding particles described by Fuchs are required to go through a costly operation for maintenance.

U.S. Pat. No. 5,202,027 issued to Stuth describes a sewage treatment system that includes a buoyant medium in the shape of large hollow balls designed to provide a site for microbial growth. The buoyant balls form but a small portion of the system, which includes a series of complex turbulent mixing sections. The Stuth device is relatively complex and likely requires considerable energy to operate in order to ensure the mixing apparently required.

U.S. Pat. No. 5,221,470 issued to McKinney describes a waste water treatment plant having a final filter made of a sheet of plastic. The sheet of plastic is wrapped about itself so as to form passageways designed for microbe growth. While this design may increase the surface area and, therefore, the dwell time available for microbial action, it is likely that plugging will occur as the passageway will likely fill with dead microbes over a period of time.

Therefore, what is needed is a waste water treatment apparatus and process that takes advantage of the useful characteristics of biological treatment in an effective manner. What is also needed is such an apparatus and process that maximizes the contact between contaminants from the waste water and the microbes without the need for a relatively large processing tank or unit. Further, what is needed is an apparatus and process that is sufficiently effective so as to reduce to desirable levels the TSS, BOD, *E-Coli*, nitrogen-containing compounds, phosphorus-containing compounds, and bacteria of that waste water in a cost-effective manner.

SUMMARY OF THE INVENTION

It is an object of the present invention to provide a waste water treatment apparatus and process that takes advantage of the useful characteristics of biological treatment in an effective manner. It is also an object of the present invention to provide such an apparatus and process that maximizes the contact between contaminants from the waste water and the microbes without the need for a relatively large processing tank or unit. Another object of the present invention is to provide a waste water treatment apparatus and process that is sufficiently effective so as to reduce to desirable levels the TSS, BOD, *E-Coli*, nitrogen-containing compounds, phosphorus-containing compounds, and bacteria of that waste water in a cost-effective manner.

These and other objectives are achieved in the present invention through an aerobic treatment process including the use of microbes retained by a suitable medium designed to provide therein retention sites for the microbes while permitting water to pass through without the possibility of plugging. This design further ensures sufficient dwell time of the contaminants that come in contact with the microbes. The process and apparatus additionally include means for recirculating initially-treated water so as to further increase dwell time.

The porous medium is preferably a set of small-sized spheres—beads—that may be hollow, but that are preferably solid. They are much smaller than buoyant balls yet large enough to create interstices through which the waste water, as well as air for the aerobic process, can pass. The interstices create significant surface area in a relatively small unit, surface area upon which the microbes can reside for interaction with the passing waste. Further, the interstices provided by the bead arrangement of the present invention are big enough to allow dead microbes to pass therethrough upon completion of their task. The net result is a continual sloughing off of dead microbes that have ingested more than their weight in contaminants. The quantity and size of the interstices created greatly increases the effective space for biological action to occur without the need for a very large treatment tank or unit. The beads are preferably substantially hydrophobic so that they are not detrimentally altered—whether by swelling or deterioration—by substantially continuous contact with water. Of course, it is necessary that there is some surface roughness or other means for retaining microbes on suitable dwelling sites on the beads surfaces. It has been determined that non-metallic materials, such as plastic beads, and polystyrene beads in particular, are suitable for use in the present invention.

Through the use of the bead medium, the treatment system of the present invention used to hold the microbes and the porous medium can be relatively small in relation to the quantity of water to be treated. Moreover, it can be larger in its horizontal dimension than its vertical, such that it can be unobtrusively low to the ground. For the most part, prior devices were made of relatively great height so that waste water had to move a considerable downward distance to reach the output point. That was the way in which dwell time could be increased. Of course, it also increased the space and cost associated with such systems. The creation of a porous medium—with maximized interstice size—through the use of the beads in the present invention, eliminates the need for large, deep treatment units. Instead, the present system may be fabricated with one or more bead-containing filtering units, which further may be stacked together as needed in order to treat a defined waste water flow in a limited space. An aspect of the present invention that enhances its effectiveness in that regard is the recirculation of partially treated water back into the bead-containing unit or units after the initial pass through.

A supplemental feature of the present invention, one that is designed to aid in significant further reduction of the contaminants in the waste water is the introduction of a following aerobic peat reactor, which acts a secondary filtering and treatment unit. It is well known that peat can be an effective natural filtering mechanism in that it promotes fungi growth that converts contaminants into harmless forms that ultimately become part of the peat mass. In the context of the present invention, the peat acts as a secondary and a tertiary treatment site. That is, the peat is a fungus mass that reduces BOD as its secondary function, and in its tertiary function it consumes disease-carrying bacteria, all forms of nitrous compounds, and many other undesirable compounds, in a manner well known to those with knowledge of the uses of peat.

While peat has this desirable characteristic to promote fungi growth and to retain the fungi, it is to be understood that the mass, when used alone, could plug over time in a waste water treatment application. It is to be noted, however, that the total mass of bacteria passing through a peat filter is minuscule in relation to the mass of the peat itself. Nevertheless, over a given period of time, the peat can clump and block or at least greatly reduced the passage of water, as well as air that is required for aerobic processing. As earlier noted, plugging of the aerobic medium is to be avoided if effective treatment is to be achieved. The present invention overcomes these problems while taking advantage of the contaminant-removal characteristics of the peat. Specifically, the secondary contaminant-removal reactor or tank—which may be a separate unit or which may form part of the primary treatment unit—preferably contains peat in combination with a medium that maintains porosity of the peat mass. Of course, the use of peat alone is an option in the present invention. When used, however, the porous medium may be the same bead medium used in the primary tank containing the microbes. The bead medium is preferably uniformly mixed with the peat and becomes part of the peat mass physically, it does not separate from the peat, and does so in a way that keeps the mass sufficiently porous so as to permit the ultimately "cleaned" water to pass therethrough to its ultimate destination. The medium to maintain porosity must not, however, interact chemically or biologically with the peat or the contaminants. In that regard, it is preferably to use non-metallic beads of the type described, including, but not limited to polystyrene beads. The quantity of bead medium used may be varied in accordance with the desire to vary peat mass porosity.

The key components of the present invention—the combination of the biological medium with the bead medium and the peat with the bead medium—provide a novel method of waste water treatment. In addition to ensuring that the waste water passes through at least one of the tanks containing either the microbes or the peat—and preferably through both—recirculating the waste water through the treatment unit provides important benefits in the system and method of the present invention. Specifically, recirculating the treated water for a second treatment pass produces desirable water properties in a system that is relatively small.

The addition of "pump back" of settled waste and microbes from the microbe treatment tank and/or any intermediary decant tank to an initial primary settling zone or unit where preliminary waste treatment occurs, is a useful feature of the present invention. A common example of such a primary settling unit would be a septic tank. The application of pump back of settled contents from one or more units or tanks to the primary settling unit, is distinct from recirculation which occurs immediately at a tank and involves the recycling of treated water as opposed to settlement. Both features, however, maximize treatment capacity and thereby minimize maintenance requirements. The use of pump back is further advantageous in that it increases de-nitrification through anaerobic processes within that primary settling unit.

The process of the present invention includes several steps that result in a waste water output having very low levels of BOD, TSS, phosphorus compounds, *E-Coli*, nitrogen compounds, and other undesirable matter. The first step in the process is to direct the waste water to the primary settling unit that permits the settling of relatively large solids. As earlier indicated, initial waste treatment occurs in this unit. From the primary settling unit the waste water is transferred to the treatment unit that includes the biological matter interspersed among the bead medium designed to create porosity. The treatment unit also includes recirculation means for the reasons noted. Since it is likely that the mass of beads and microbes of the treatment unit has a lower specific gravity than the water, the medium will have to be retained in some way to fix it in a desired position. This may be achieved by capturing it in porous netting that is held to the primary tank in some way. The waste water is preferably directed to the microbe-bead medium combination by way of spray heads so as to provide uniform dispersement. The spray heads also provide a means of supplying air for aerobic activity. A portion of the waste water that has passed through the combination is recirculated back through the microbe/bead combination for additional biological action.

The treatment tank is preferably designed to permit settling of dead microbes and to enable initial transfer of the treated waste water into a downstream decant region or tank for additional solids settling. As earlier noted, a portion of the resultant waste water sludge from the treatment tank and from the decant tank is then preferably pumped back to the primary settling tank for supplemental anaerobic processing to reduce nitrogen compounds. The decant tank preferably includes aeration means, such as a sparger with a coupled forced air supply, further aids in reducing BOD levels and in enhancing water clarity.

From the decant region or tank, the treated water is transferred to a final filter/secondary treatment peat reactor unit containing the peat mass and the pore-creating medium. The waste water is permitted to intermittently trickle down through the peat mass in a way that causes a re-aeration of the mass—necessary for the aerobic process—and in a way which occurs normally in household systems. In this way any significant level of the various contaminants noted become part of the peat mass. The filtered water that passes through the peat mass is then drawn off or otherwise moved to another site, such as a leach field, a secondary water user, such as a toilet, to a final usable water site, such as via a soak hose system, or it can be discharged to nearby water bodies.

These and other advantages of the present invention will become apparent upon review of the following detailed description of the invention and the accompanying drawings.

BRIEF DESCRIPTION OF THE DRAWINGS

FIG. 1 is a simplified diagrammatic illustration of a preferred arrangement of the basic components of the waste water treatment system of the present invention.

FIG. 2 is an expanded view of the combination of the porous bead medium and the biological medium used to accomplish effective aerobic waste water treatment.

DETAILED DESCRIPTION OF THE PREFERRED EMBODIMENT

A preferred embodiment of a waste water treatment system and process is shown in FIG. 1. In that drawing, a septic tank 1, or other form of primary settling tank or unit may be used for initial settling of large solids from the waste water initially transferred from some type of facility, whether a single-family residence, a grouping of buildings, or an industrial facility. The septic tank 1 may be an existing unit, or it may be provided as part of an integrated treatment system of the present invention. The present invention includes a primary treatment unit or zone that is preferably a recirculation tank 2, as well as a decant unit or zone that is shown as tank 3, and a peat filter reactor unit or zone that is shown as tank 4. However, it is to be noted that if a septic tank 1 or other type of settling unit is used, that settling unit may be incorporated into a single unit including tanks 1, 2, 3, and 4. If the tank 1 is pre-existing, tanks 2, 3 and 4 may form a single integral unit, but for city-sized and other commercialsized systems, tanks 1 and 4 likely would be designed as units separate from the other tanks, while tanks 2 and 3 would generally preferably be combined into one tank. Of course, air must be supplied at least to tanks 2 and 4 in order to permit aerobic activity to take place. This may be achieved in any of a number of ways well known to those skilled in this field.

Recirculation tank 2 is the primary treatment and recirculation part of the process and includes a gravity inflow inlet for delivery of the waste stream 5 from the septic tank 1. Tank 2 is preferably maintained at a level 6, as determined by the level of the decant tank 3. It is to be noted that tank 1 may be at a higher level than that of decant tank 3. A recirculation pump 7 is either on a timer, or it pumps the waste water continuously (as needed to treat the waste) up through a spray header 8, whereby the recirculation flow at 7' is generally at least 20 times the inflow at the septic tank 1 at input 19. The recirculation flow at 7' from header 8 trickles down through a medium 9 that is preferably a plurality of containers each containing a plurality of small-sized beads 30 of the general arrangement shown in FIG. 2 as a close up of region 50 of tank 2, and contained in pore-creating-medium containers, an exemplar of which is shown as mesh bag 31. The beads 30 are solid, made of polystyrene, and are about 0.10 inch in diameter—although they can be larger or smaller, so long as they provide suitable interstices for dwelling of active microbes and so that they permit sloughing off of dead microbes. They provide a high specific area medium on which the aerobic microbes can grow, and thereby consume dissolved pollutants in waste stream 5. These interstices also permit air to pass therethrough so as to ensure aerobic activity. Dead microbes wash off the beads/microbes combination 9 and settle into a secondary sludge area 26. From there the dead microbes are periodically pumped back into the front end of tank 1 by pump 28. A support 32 for the bead-containing mesh bag 31 may be of any suitable design sufficient to easily permit the treated water to pass through—such as a type of grate—and may preferably be a series of closely spaced bars 32.

In order to ensure that the aerobic microbe action is, in fact, aerobic, air flow 11 from blower 12 passes down through medium 9 providing air for the microbes, such air passing into plenum space 13, out through opening 14 to the decant tank 3. Such air flow could also be reversed, with air added into plenum space 13, directed up through the mesh bags 31, and out the top of tank 2. Overflow 15 from tank 2 passes down near the bottom of tank 3 into area 16 and up and out through overflow opening 17 into filter tank 4. Additional dead microbes settle out into secondary sludge area 25 of decant tank 3, which is also preferably pumped back into tank 1 in the same manner that settlement return is achieved using pump 28 and in similar proportions.

Secondary surge volume 18 of filter tank 4 serves to accommodate surge flows into the system as determined by septic tank inflow 19. Decanted water flow 17' from decant tank 3 passes by gravity down through peat filter medium 20. Filter medium 20 includes a uniform mixture of the material used to create the porous medium 9, such as the beads 30 used in tank 2, and un-dried moss based peat, preferably of Von Post 4 or equal, such un-dried moss based peat being as harvested, or as wet peat. Un-dried moss based peat is necessary for the filter medium 20 to work properly so as to absorb the final microbe solids and other bacteria such as *E. Coli*. Undried peat preserves cellular integrity, i.e., the peat cells have not previously been collapsed by drying. This preserves the peat's high specific surface area for maximum absorbency and biological action. To balance filter flow rate with the peat's high surface area—which impedes gravity down-flow through the filter—the ratio of peat to beads by volume has been determined by experiment to be about 1.25 to 1, which achieves a clear final cleaned water output at 23. To achieve this clear output, a filter media depth of about 16 inches as compacted in two layers of substantially equal volume is necessary. One layer generally collapses one inch from hand compaction, thus about 9 inches must be added for each layer to achieve 16 inches as a total of two layers. The support for filter medium 20 may be of any reasonable type suited for the noted purpose, and preferably would be a screen covered by 2 inches of pea gravel on screen prior to adding well mixed media. A thin layer of about one inch of pea gravel is also added to the top of the media so as to prevent beads, if of low density—a specific gravity of less than one—from floating to the top when water in-flow occurs at 17'. A peat zone recirculation means at 51 may be employed, desired, to further enhance the filtering and interaction of treated and filtered water by the peat mass.

In the preferred embodiment of the invention there is a surge zone 21 below the filter support (not shown) to accommodate on/off level controlled pump 22. An air-flow outlet 24 is taken off from the top of tank 4. Secondary sludge 25 and 26 are pumped back from tanks 3 and 2 respectfully into septic tank 1 by pump 28 where it settles to become part of primary sludge 27 of tank 1. The daily pump back volume of pump 28 generally equals the volume of the waste water at water stream 19, or some fraction thereof. The aerobic volumetric fraction supplied by pump 28 so mixed at and with the anaerobic input by stream 19 will cause de-nitrification to take place by well known processes within septic tank 1. Primary sludge 27 and secondary sludge 25 and 26 as recirculated into tank 1, are periodically pumped to a dewatering device by pump 29, or are removed from a usual opening at the top of septic tank 1 by usual septic tank pump truck, not shown.

Pump 22 may be used to direct cleaned water from output 23 to a plurality of locations. One such location may simply be a standard leach field such as at 33. Alternatively, at 34, cleaned water may be directed to a surge tank 35 having surge tank pump 36 for directing cleaned water either to secondary water use locations, e.g., toilets, at 37, or to a water dispersion unit 38 via 39. A standard ultraviolet supply unit 40 may be used to further treat the water as desired or required. The water dispersion unit 38 may be any type of unit permitting controlled dispersion of water, including, but not limited to, a soak hose system 38, having a header 41 for pressure build-up. Such a unit permits transpiration of water to plants, etc., via a plurality of well-known porous flexible soak hoses or drip-irrigation hoses that may be arranged about plant life roots in any desired manner at a level just below the surface.

The addition of air from air compressors 43 and 43' through spargers 45 and 45' near the base of the beginning and/or front end of decant tank 3 and the surge tank 35, respectively, can further aid in the reduction of BOD and the enhancement of water clarity. Air bubbles 44 leave the decant tank 3 through opening 17, while air bubbles 44' leave the surge tank 35 through a loose-fitting tank cover 35'. As sparger-aerated water passes through tank 3 and tank 35, BOD is reduced and more solids are generated in tank 3 for settling and subsequent pump back to tank 1. The small amount of solids generated in tank 35 and settled would be periodically removed either during scheduled maintenance via cover 35', by pump 36, or a combination of the two.

The basic process for treating the waste water entering the system of the present invention via stream 19 is substantially as indicated. That is, the basic process includes directing the waste water through settling tank 1 to tank 2, passing it through medium 9 and decanting treated water into decant tank 3. The decanted water is then transferred to filter tank 4 and passed through the peat medium 20 for final cleaning, before the clean water is transferred to a desired location. Key features of the process include providing the small-sized beads 30 in combination with the microbes in the manner that creates interstices for microbe action and microbe sloughing off. In addition, the use of the porous medium, which may also be the beads 30 in the peat filter medium 20, in a ratio of beads to peat that permits the peat to act as intended while keeping the entire medium 20 sufficiently porous, is a novel aspect of the process of the present invention. The treated water may then be directed to most any desired location, including, but not limited to, such disparate sites as leach fields, toilets, irrigation devices, or soak hoses.

The invention description presented herein is directed to a specific embodiment; however, it is apparent that many modifications, variations, and equivalents may be implemented by one skilled in the art without departing from the spirit and scope of the novel concepts of the present invention.

We claim:

1. A waste water treatment system, comprising:

a) a recirculation tank for containment of waste water to be treated, said tank defining an interior volume consisting of i) a lower volume portion defined as the volume of waste water to be contained in said tank during system operation, ii) an upper volume portion, and iii) an intermediary volume portion separating said lower volume portion and said upper volume portion, the combined volumes of said upper volume portion and said intermediary volume portion being defined as the difference between said interior volume and said lower volume portion;

b) treatment medium comprising a fixed bed of hydrophobic particles sized to create interstices therebetween and surface area sufficient for aerobic microbes to grow and for dead microbes and treated waste water to pass therethrough;

c) means for supporting said treatment medium within said upper volume portion and above said lower volume portion of said recirculation tank;

d) means for transferring waste water to be treated into said recirculation tank;

e) means for transferring treated waste water from said lower volume portion of said recirculation tank;

f) means for introducing air into said upper volume portion of said recirculation tank; and g) means for recirculating liquid from said lower volume portion of said recirculation tank to said treatment medium.

2. The waste water treatment system of claim 1, wherein said hydrophobic particles are nonporous.

3. The waste water treatment system of claim 1, wherein said hydrophobic particles are made of plastic material.

4. The waste water treatment system of claim 3, wherein said plastic material is polystyrene.

5. The waste water treatment system of claim 1, wherein said hydrophobic particles comprise beads.

* * * * *